(12) United States Patent
Nikanorov et al.

(10) Patent No.: US 7,671,307 B2
(45) Date of Patent: Mar. 2, 2010

(54) TRANSVERSAL FIELD HEATING INSTALLATION FOR INDUCTIVELY HEATING FLAT OBJECTS

(75) Inventors: Alexander Nikanorov, Hannover (DE); Holger Schuelbe, Meissner (DE); Bernard Nacke, Burgdorf (DE)

(73) Assignee: Universitaet Hannover, Hannover (DE)

( * ) Notice: Subject to any disclaimer, the term of this patent is extended or adjusted under 35 U.S.C. 154(b) by 656 days.

(21) Appl. No.: 10/549,037

(22) PCT Filed: Mar. 18, 2004

(86) PCT No.: PCT/DE2004/000573

§ 371 (c)(1), (2), (4) Date: Sep. 15, 2005

(87) PCT Pub. No.: WO2004/084586

PCT Pub. Date: Sep. 30, 2004

(65) Prior Publication Data

US 2006/0196870 A1    Sep. 7, 2006

(30) Foreign Application Priority Data

Mar. 19, 2003   (DE) ................................. 103 12 623

(51) Int. Cl.
*H05B 6/40* (2006.01)

(52) U.S. Cl. ........................ 219/645; 219/670; 219/656; 219/675

(58) Field of Classification Search ................. 219/645, 219/671, 672, 667, 670, 673, 635, 636, 656, 219/660, 662, 653, 646; 266/129
See application file for complete search history.

(56) References Cited

U.S. PATENT DOCUMENTS

| | | | | |
|---|---|---|---|---|
| 2,479,341 A | * | 8/1949 | Gehr et al. | 219/653 |
| 4,357,512 A | * | 11/1982 | Nishimoto et al. | 219/608 |
| 4,751,360 A | | 6/1988 | Ross | 219/10.61 R |
| 5,173,246 A | * | 12/1992 | Schwarz et al. | 266/129 |
| 5,403,994 A | * | 4/1995 | Havas et al. | 219/645 |
| 6,570,141 B2 | * | 5/2003 | Ross | 219/645 |
| 6,576,878 B2 | * | 6/2003 | Thorpe et al. | 219/645 |
| 2002/0121512 A1 | | 9/2002 | Thorpe et al. | |

FOREIGN PATENT DOCUMENTS

| | | |
|---|---|---|
| DE | 39 28 629 A1 | 8/1989 |
| DE | 42 34 406 C2 | 10/1992 |

(Continued)

*Primary Examiner*—Quang T Van
(74) *Attorney, Agent, or Firm*—Whitham Curtis Christofferson & Cook, PC

(57) ABSTRACT

A transversal field heating installation for inductively heating flat objects transported in an advancing direction includes at least one inductor unit that extends across the width of the flat object. The inductor unit has at least two superimposed inductor layers parallel to the plane of the flat object. These inductor layers can be independently displaced transversally in relation to the advancing direction of the flat object, and each have two inductor sections with two parallel interspaced base limbs extending transversally in relation to the advancing direction and one lateral limb. Each inductor layer has lateral limb per strip edge of the flat object. The inductor sections of an inductor layer can be independently displaced transversally in relation to the advancing direction of the flat object.

7 Claims, 2 Drawing Sheets

FOREIGN PATENT DOCUMENTS

| | | |
|---|---|---|
| DE | 694 27 460 T2 | 11/1994 |
| DE | 100 13 061 A1 | 3/2000 |
| EP | 0 667 731 B1 | 6/2001 |
| EP | 1 221 826 A2 | 7/2002 |
| JP | 63195397 A | 8/1988 |
| WO | WO 01/69977 A1 | 9/2001 |

* cited by examiner

TRANSVERSAL FIELD HEATING INSTALLATION FOR INDUCTIVELY HEATING FLAT OBJECTS

FIELD OF INVENTION

The invention relates to a transversal field heating installation for inductively heating flat objects that can be transported in an advancing direction, with at least one inductor unit extending transversely in relation to the advancing direction over the width of the flat object.

Instead of conventional gas-heated furnaces, flat objects, such as metal sheets, strips and thin slabs for example, are inductively heated. This involves inducing a current in the metal sheet, whereby the material is heated. As a result, heat losses and burning losses are advantageously avoided. Moreover, the achievable power densities have considerably smaller space requirements and shorter heating-up times are possible.

BACKGROUND

Inductive heating installations for flat objects are either of the longitudinal field heating type or of the transversal field heating type. In the case of longitudinal field heating, the metal sheet to be heated is completely enclosed by the inductor coil, so that the main magnetic flux is directed in the advancing direction of the sheet. The induced currents follow a continuous path over the cross section of the workpiece, the resultant temperature distribution at a suitable frequency of the inductor current being virtually homogeneous over the entire strip width of the flat object. A disadvantage is the high required frequency and limited efficiency.

This was the reason for the development of transversal field heating installations, in which the induction coils do not enclose the flat object but are arranged on the surfaces of the flat object that is to be heated. In this way, the main magnetic flux of the induction coil is directed perpendicularly in relation to the surface of the flat object. However, the disadvantage of transversal field heating installations is that the temperature distribution in the flat object is normally inhomogeneous. This requires an adapted design of the geometrical dimensions and an optimization of the operating parameters of a transversal field heating installation for each case in which it is used.

In A. Ruhnke, A Mühlbauer, A. Nikanorov, V. Demidovitch, "Wege zur Optimierung von Querfeld-Erwärmungsanlagen" [Ways of optimizing transversal field heating installations], Elektrowärme International, issue B4, December 1997, pages 130 to 137, it is described that the disadvantageous inhomogeneous temperature distribution can be influenced by specific configuration of the induction coil. In the design of transversal field heating installations, account must be taken off the complex three-dimensional distribution of the electromagnetic field variables that are not analytically determinable. Moreover, numerous operating and installation parameters must be predicted and taken into account. A major influencing factor here is the strip overhang. This is the distance between the outer edge of the end winding of the inductive coil and the strip edge of the flat object. Furthermore, it is described that the installations can be adapted more flexibly to the respective requirements with the aid of multi-turn coils, in that the geometry of the end windings is varied by a spread distribution of the individual conductors.

For flexible setting of the temperature distribution in the flat object, an inductor loop comprising two induction coils transversely in relation to the flat object and two induction coils longitudinally in relation to the flat object is described in Japanese Patent Application 63195397. The two coils extending in the longitudinal direction of the flat object can be displaced in the transverse direction of the flat object, so that the temperature distribution at the side edges of the flat object can be set.

Furthermore, DE 39 28 629 A1 discloses the use of an inductor coil for induction furnaces in which grooves of an iron core formed by transformer sheets are let in. The iron cores are formed in a zigzag or undulating manner and the current conductors are switchable, so that the installation can be set flexibly to the respective width of the flat object.

Furthermore, EP 0 667 731 B1 discloses a transversal field heating assembly with an adjustable width for induction heating, in which two halves of an inductor coil can be displaced parallel to each other, so that the distance of the end windings from one another can be changed. In this way, the inductor unit can be flexibly adapted to the respective width of the flat object.

Furthermore, in DE 42 34 406 A1 there is described a transversal field sheet heating installation in which the inductor coils are arranged in the advancing direction of the flat object in such a way that each edge of the flat object is projected over by the end windings of only one induction loop. The end windings consequently end alternately in the region of the side edge on the right and the side edge on the left of the flat object and do not protrude beyond the side edge.

The problem of the conventional transversal field heating installations is that it is only possible with great effort for them to be adapted to the respective operating situation, in particular the strip width. Moreover, the end winding, which is important for the temperature distribution, cannot be varied at the edges of the strip in conventional transversal field heating installations.

The end winding is important in this way because, as described for example in DE 100 13 061 A1, optimal configuration of it allows the temperature distribution to be made considerably more uniform, in particular at the strip edges.

SUMMARY

With the transversal field heating installation of the generic type, these aforementioned problems are solved according to the invention by the inductor unit having at least two inductor layers arranged one on top of the other parallel to the plane of the flat object, which layers can be displaced independently of each other transversely in relation to the advancing direction, the inductor layers in each case having two inductor portions, each with two base limbs extending transversely in relation to the advancing direction and a lateral limb extending transversely in relation to the base limbs and connecting two ends of the base limbs, an inductor layer having one lateral limb for each strip edge of the flat object, the inductor portions of an inductor layer being displaceable independently of each other transversely in relation to the advancing direction.

The multilayered construction of the inductor unit achieves the effect that the lateral limbs of the inductor layers for each strip edge can be displaced with respect to each other transversely in relation to the advancing direction, so that the effective width of the end winding can be set in this way. The two-part construction of each inductor layer achieves the effect that the effective width of the inductor unit can be set. Consequently, both a stepless setting of the inductor unit to the respective strip width of the flat object is possible and at the same time the temperature distribution can be optimally set by optimizing the end winding, i.e. in the region of the lateral limbs and the strip edges.

Preferably, base limbs of different inductor portions, arranged in parallel and directly next to one another, of an inductor layer lying on the same plane with respect to the plane of the flat object are arranged so close together that the electromagnetic field is compensated in this region. In this case, the current in these base limbs, lying directly next to one another, runs in opposite directions. This compensation takes place at the strip edge in the region of which the base limbs of the two inductor portions of an inductor layer are located, so that there in particular, as compared with the other strip edge, a similar electromagnetic field, and consequently a similar temperature distribution, is ensured. In this case, the currents which flow through the individual inductor portions must be the same in order to ensure the compensation. In the different layers, however, different currents may flow.

The pole widths of the inductor portions, as the distance between the parallel base limbs respectively of an inductor portion, may be the same for different inductor layers or else different from one another.

In an advantageous embodiment, the inductor has field-guiding laminated cores, which are for example formed as ferrites, in order to adapt the heat source and temperature distribution in the flat object. In this way, stray fields in the outer region are also reduced and the efficiency improved. Also advantageous is an electromagnetic shielding, for example in the form of copper plates.

The end windings of the inductor portions which are defined by the lateral limbs and the end portions of the base limbs connected thereto may have a profile that is angular, rounded-off or adapted to the respective operating situation.

DESCRIPTION OF THE DRAWINGS

The invention is explained in more detail below on the basis of the accompanying drawings, in which.

DETAILED DESCRIPTION

Figure 1:
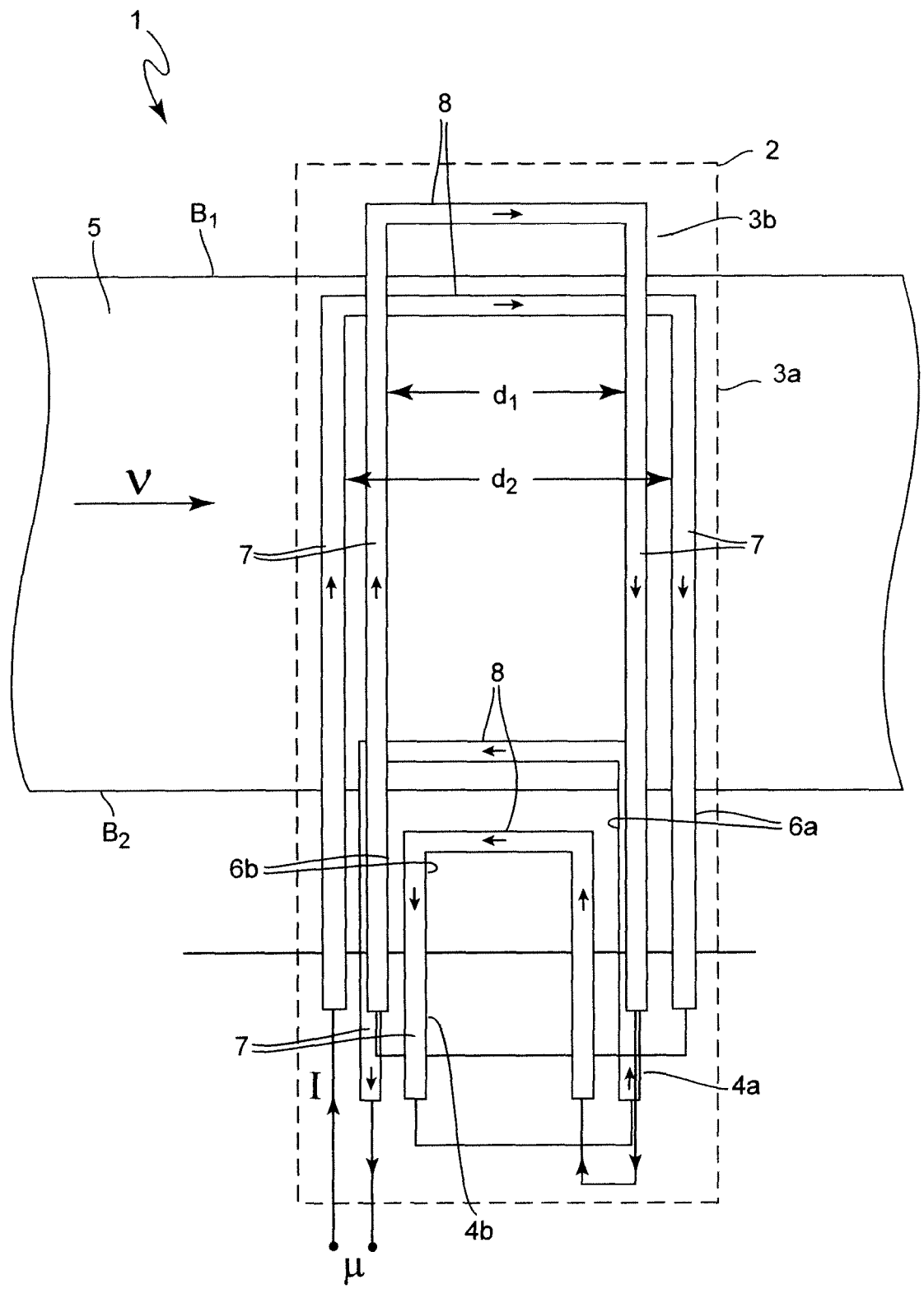
FIG. 1 shows a schematic representation of an inductor unit according to the invention.
Figure 2:
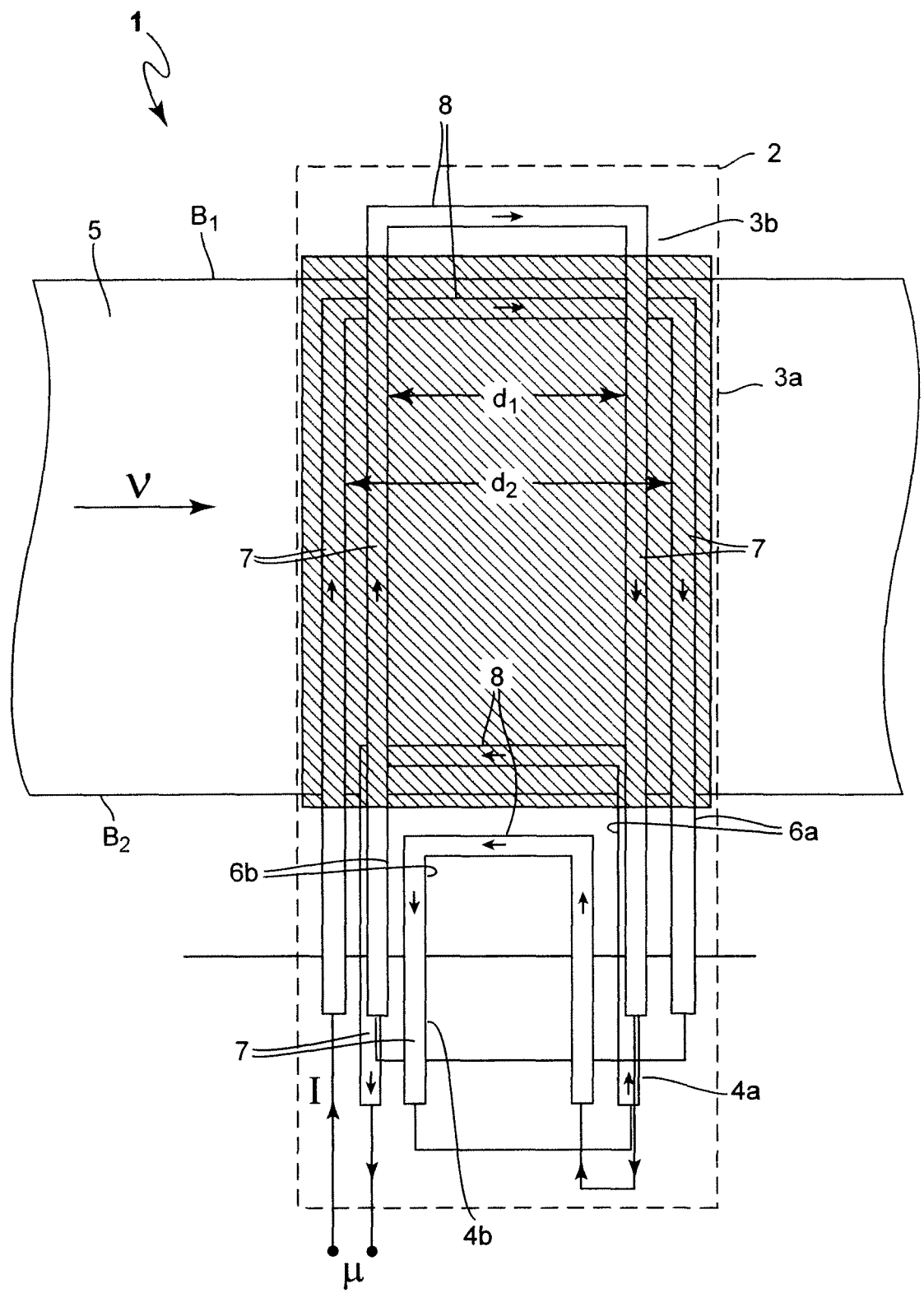
FIG. 2 shows the schematic representation of an inductor unit FIG. 1 with areas highlighted by hatching.

FIG. 1 schematically shows the transversal field heating installation 1 according to the invention. The transversal field heating installation 1 has an inductor unit 2 with four inductor portions 3a, 3b, 4a, 4b, which are arranged on two planes one above the other parallel to the surface of the flat object 5. In this case, the inductor portions 3a, 4a form a first inductor layer 6a in a first plane above the flat object 5. The inductor portions 3b, 4b form a second inductor layer 6b on a plane lying above the first. A number of inductor units 2 may also be provided in a transversal field heating installation 1, for example next to one another and/or above and below the flat object 5.

The two inductor layers 6a, 6b are displaceable transversely in relation to the advancing direction V, parallel to each other in the direction in which they extend. In this way, the effective width of the inductor unit 2 can be set.

As represented, the inductor layers 6a, 6b have in each case two inductor portions 3a, 4a and 3b, 4b. Each inductor portion 3, 4 respectively has two longer base limbs 7, spaced apart from each other in parallel and extending transversely in relation to the advancing direction V, and respectively has a shorter lateral limb 8, which connects the ends of the base limbs 7 that are not intended for the current connection to each other and extends in the advancing direction V. The lateral limbs 8 are arranged in the region of the strip edges $B_1$, $B_2$ on the right and left, each inductor layer 6a, 6b respectively having a lateral limb 8 in the region of the strip edge $B_1$ on the right and the strip edge $B_2$ on the left. The distance D1 between the parallel base limbs 7 of the second inductor portion 3b and 4a may be the same distance D2 between the parallel base limbs 7 of an adjacent first inductor portion 3a. However, as in the embodiment shown, the distances D1, D2 may be different for adjacent inductor layers.

The base limbs 7 of the inductor portions 4a, 4b arranged on the right, as seen in the advancing direction V, extend outwardly away from the lateral limbs 8 and the flat object 5, so that they are scarcely active for heating the flat object 5.

The inductor portions 3a and 4a and also 3b and 4b of each inductor layer 6a, 6b are likewise displaceable relative to one another transversely in relation to the advancing direction V. In this way, not only the effectively active width of the inductor unit 2, but also the width of the end winding formed by the lateral limbs 8 and the portions of the base limbs 7 lying in this region can be set. This is so because, by displacement of the inductor layers 6a, 6b in relation to each other and also the inductor portions 3a, 4a and 3b, 4b respectively of an inductor layer 6a, 6b in relation to one another, the distances between the lateral limbs 8 for each strip edge $B_1$ and $B_2$ can be varied. This distance substantially determines the geometry of the end winding.

The inductor portions 3, 4 are preferably subjected to the same current I and, as represented, are connected together and clamped to a voltage source U. The fact that the parallel base limbs 7 of different inductor portions 3a, 4a and 3b, 4b of an inductor layer 6a and 6b respectively lying directly next to one another are arranged with a very small distance from one another has the effect in each case of compensating for the electric field in this region, since the directions of the current of the respectively interacting base limbs 7 are opposed to one another. The current connection for the corresponding ends of the base limbs 7 may take place for example with clamping jaws, which are clamped onto the circumference of the base limbs, for example with clamping screws. Furthermore, it is advantageous if the inductor portions 3, 4 are formed from a tube with a round or angular cross section, a fluid connection being respectively provided at the openings of the inductor portions 3 and 4, in order for a coolant to flow through the hollow inductor portions 3, 4.

The invention claimed is:

1. A transversal field heating installation or inductively heating flat objects that can be transported in an advancing direction, comprising:

at least one inductor unit extending transversely in relation to the advancing direction over the width of a flat object, wherein the at least one inductor unit has at least two inductor layers placed on one side of the flat object and arranged one on top of the other parallel to the plane of the flat object, said at least two inductor layers can be displaced independently of each other transversely in relation to the advancing direction, each of the inductor layers having two inductor portions, each inductor layer comprising two base limbs spaced apart from each other in parallel and extending transversely in relation to the advancing direction, and where the inductor portions of an inductor layer of said at least two inductor layers are displaceable independently of each other transversely in relation to the advancing direction.

2. The transversal field heating installation as claimed in claim 1, wherein base limbs of an inductor portion of said inductor layer extend away from the flat object, starting from an assigned lateral limb.

3. The transversal field heating installation as claimed in claim 1, wherein distances between parallel base limbs of the inductor portions of adjacent inductor layers differ.

4. The transversal field heating installation as claimed in claim 1, wherein a distance between parallel base limbs of adjacent inductor portions of an inductor layer, which can in each case be subjected to current running in different directions, is chosen to be so small that the electromagnetic field is compensated.

5. The transversal field heating installation as claimed in claim 1, wherein the at least two inductor layers have one or more of field-guiding laminated cores and electromagnetic shielding.

6. The transversal field heating installation as claimed in claim 1, wherein end windings of the inductor portions, which are defined by lateral limbs and end portions of base limbs connected to them, have a profile which is angular or rounded off.

7. The transversal field heating installation as claimed in claim 1, wherein said at least one inductor unit includes at least a pair of inductor units provided above and below the flat object, wherein the inductor portions the pair of inductor units are aligned in mirror image or inverted mirror image in relation to one another.

* * * * *